United States Patent [19]
Hayes

[11] 3,915,985
[45] Oct. 28, 1975

[54] PROCESS FOR PREPARING NAPHTH[1,2-D]IMIDAZOLE AND INTERMEDIATE THEREFOR 1-HYDROXYNAPHTH[1,2-D]IMIDAZOLE HYDRATE

[75] Inventor: Kenyon J. Hayes, Norwich, N.Y.

[73] Assignee: Morton-Norwich Products, Inc., Norwich, N.Y.

[22] Filed: May 13, 1974

[21] Appl. No.: 469,473

[52] U.S. Cl. .............................................. 260/309.2
[51] Int. Cl.² ...................................... C07D 235/02
[58] Field of Search ................................ 260/309.2

[56] References Cited
UNITED STATES PATENTS
3,634,448  1/1972  Hayes ............................ 260/309.2

OTHER PUBLICATIONS

Povstyanoi et al., Chem. Abst. Vol. 76, No. 46136w (1972).
Ried et al., Chem. Abst. Vol. 50, columns 366–367 (1956).
Takahashi et al., I Chem. Pharm. Bull., (Japan) Vol. 11, pp. 1375–1381 (1963).
Takahashi et al., II Chem. Parm. Bull. (Japan) Vol. 12, pp. 282–291 (1964).

Primary Examiner—Natalie Trousof
Attorney, Agent, or Firm—Anthony J. Franze

[57] ABSTRACT

The optical brightener naphth [1,2-d]imidazole is prepared by a process involving reaction of 1-nitroso-2-naphthol with formalin and ammonium hydroxide to produce 1-hydroxynaphth [1,2-d]imidazole followed by its reduction in the presence of Raney nickel.

1 Claim, No Drawings

PROCESS FOR PREPARING NAPTHT[1,2-d]IMIDAZOLE AND INTERMEDIATE THEREFOR 1-HYDROXYNAPHTH[1,2-d]IMIDAZOLE HYDRATE

This invention is concerned with a process. More particularly this invention aims to provide an improved process for preparing the optical brightener naphth [1,2-d] imidazole and a new intermediate 1-hydroxynapth [1,2-d] imidazole useful therein.

In the U.S. Pat. No. 3,634,448 there is described a process for preparing naphth [1,2-d] imidazole. The instant invention provides an improved, alternative process for its preparation in that less expensive reactants and a less corrosive basic reaction medium are employed; ammonium hydroxide vis-a-vis an hydroxylammonium salt and sulfuric acid. Also the intermediate used in the instant process is more readily purified than that employed in the cited patent.

In accordance with the instant invention 1-nitroso-2-naphthol, formalin and ammonium hydroxide are brought together in an alkanol solvent such as methanol, ethanol and isopropanol or aqueous mixtures, thereof preferably under the influence of heat and for a time period sufficient to permit reaction to ensue whereupon 1-hydroxynaphth [1,2-d] imidazole monohydrate is obtained by filtration. Catalytic reduction of 1-hydroxynaphth [1,2-d] imidazole monohydrate is easily accomplished in the presence of Raney nickel.

In order that this invention may be readily available to and understood by those skilled in the art the following description is supplied.

A. 1-Hydroxynaphth [1,2-d] imidazole monohydrate

In a 2-liter, 3-neck flask fitted with a paddle stirrer, reflux condenser and dropping funnel and set in a heated water bath were placed 89 g (0.514 moles) of 1-nitroso-2-naphthol, 500 ml of methanol and 110 ml of conc. ammonium hydroxide. Stirred and heated to 45°C. Added dropwise during 3.25 hours 81 g (1.0 moles) of 37 percent formalin. The temperature was maintained at 45°–55°. The green solution slowly became yellow brown. After 6.25 hours of heating the solution was transferred to a 3-liter beaker; added 78 ml of conc. HCl and 1.5 l. of ice and water. The suspension (pH 4) was filtered on a Buchner funnel. Unreacted nitrosonaphthol was extracted from the crude by washing with 200 ml of i-PrOH at 50°, 2 × 60 ml i-PrOH and 100 ml CH$_3$OH. The solid was dried at 105° then boiled with 200 ml of CH$_3$OH and filtered hot to complete removal of nitrosonaphthol. Redried product at 105°; 68 g (65.4 percent) m.p. dec. 207°–8°.

The alcoholic extracts of unreacted nitrosonaphthol were added to the aqueous methanolic reaction filtrate, diluted to 4 l. with water and the nitrosonaphthol collected. This was dissolved in 250 ml CH$_3$OH plus 50 ml conc. NH$_4$OH and 30 ml of 37% formalin and heated to 50°–55° for 3.6 hours. This was diluted with 1200 ml of water and 25 ml of conc. NH$_4$OH, charcoal and diatomaceous earth added and all heated for 0.3 hours. The alkaline mixture was filtered on a Buchner at 50°. The brown filtrate was acidified to pH 4 with conc. HCl. The yellow solid was collected, washed with water and dried at 105°. 12.5 g (12.0 percent) m.p. dec. 218°–20°.

The combined crude products (80.5 g) were dissolved in a mixture of 1 l. water and 32 g NaOH; added charcoal and diatomaceous earth, stirred at 40° for 0.5 hours and filtered by suction thru hardened filter paper. The filtrate was acidified with conc. HCl to pH 4, filtered on a Buchner, washed with water and dried at 105°; 80 g. 77 percent yield, m.p. dec. 214°–5°.

A sample dried at 100° in vacuo, analyzed: 65.31% C, 4.23% H, 13.58% N. Calc'd. for C$_{11}$H$_8$N$_2$O H$_2$O: 65.4% C, 4.97% H, 13.82% N.

B. Naphth [1,2-d] imidazole

In a 1.8 l. stainless steel hydrogenation flask for a Parr hydrogenation apparatus were placed 35.0 g of A. (0.173 moles), 900 ml of CH$_3$OH and 55 g of wet Raney nickel No. 28 catalyst. At 40 psi hydrogen pressure the material was hydrogenated at room temperature. In 5.25 hours 100 percent of the theoretical amount of hydrogen had been absorbed and the uptake ceased.

The catalyst was removed by filtration and washed 2 × 300 ml CH$_3$OH. The filtrate and washes were concentrated by distillation from a water bath to a volume of 200 ml. The solution was diluted with 180 ml of water and 20 ml of conc. HCl; added 10 g of Darco and heated to 65°C. Filtered warm and washed the Darco with 50 ml of boiling 50 percent aq. methanol. Added 30 ml conc. HCl to the filtrate and cooled the solution. The hydrochloride salt was filtered. The undried hydrochloride was heated at 55°C. with 175 ml water, 75 ml i-PrOH and 10 ml acetic acid, then added conc. NH$_4$OH to pH 5. Cooled to 5°; filtered the product and dried at 105° giving 25.1 g. This was dissolved in 100 ml of methanol plus 15 ml NH$_4$OH using Darco, added one volume of water to the filtrate and refrigerated whereupon 21.7 g of nearly white crystals were obtained (m.p. 169°–73°). This material was dissolved in 250 ml of 66 percent aq. methanol containing 10 g of sodium hydroxide; added Darco and filtered thru hardened filter paper. The filtrate was diluted with water to 600 ml and cooled to 0°. Filtered and dried at 105°C; 18.2 g (61.8 percent yield) m.p. 183.0°–183.5°C.

What is claimed is:

1. The compound 1-hydroxynaphth [1,2-d] imidazole hydrate.

* * * * *